(12) United States Patent
Palazzolo

(10) Patent No.: US 6,719,660 B2
(45) Date of Patent: Apr. 13, 2004

(54) POWER TRAIN ASSEMBLY

(75) Inventor: Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/124,644

(22) Filed: Apr. 17, 2002

(65) Prior Publication Data

US 2003/0040394 A1 Feb. 27, 2003

Related U.S. Application Data

(60) Provisional application No. 60/315,118, filed on Aug. 27, 2001.

(51) Int. Cl.$^7$ ............................................. B60K 17/344
(52) U.S. Cl. ........................ 475/221; 475/206; 180/248
(58) Field of Search ................. 475/221, 200, 475/206; 180/248, 233

(56) References Cited

U.S. PATENT DOCUMENTS

| | | | |
|---|---|---|---|
| 4,428,452 A | | 1/1984 | Muraoka et al. |
| 4,589,304 A | * | 5/1986 | Ashikawa et al. ........... 475/225 |
| 4,682,516 A | | 7/1987 | Okubo |
| 4,697,470 A | * | 10/1987 | Sasaki et al. ................ 475/206 |
| 4,915,191 A | * | 4/1990 | Kotajima ..................... 180/248 |
| 5,685,389 A | * | 11/1997 | Muller ........................ 180/249 |
| 5,704,443 A | * | 1/1998 | Janiszewski ................ 180/247 |
| 6,076,623 A | * | 6/2000 | Teraoka et al. ............. 180/233 |
| 6,158,303 A | * | 12/2000 | Shiraishi et al. ........... 74/665 T |
| 6,513,615 B2 | * | 2/2003 | Bowen et al. .............. 180/248 |

FOREIGN PATENT DOCUMENTS

| | | |
|---|---|---|
| GB | 2074517 | 4/1981 |
| GB | 2097736 | 4/1982 |
| GB | 2092968 | 8/1982 |
| JP | 6135249 | 5/1994 |
| JP | 10-138773 A * | 5/1998 |

* cited by examiner

*Primary Examiner*—Ankur Parekh
(74) *Attorney, Agent, or Firm*—Brinks Hofer Gilson & Lione

(57) ABSTRACT

The present invention provides a integral subassembly for the power train of an all wheel drive automotive vehicle. The subassembly includes a final drive unit coupled to a transmission output. The final drive unit itself includes a torque multiplier and an output adapted to provide power to the front wheels of the vehicle. Also included in the subassembly is a front differential coupled to the final drive's output. The front differential includes a left front wheel output and a right front wheel output. A power transfer unit in the subassembly is also coupled to the transmission output and provided with a non-parallel gear set and a rear driveline output, the latter being adapted to provide power to the rear wheels of the vehicle. The power transfer unit is coupled to the transmission output independently of the final drive unit. Finally, a housing commonly encloses the final drive unit, front differential and power transfer unit allowing them to be integrally provided as a subassembly.

18 Claims, 3 Drawing Sheets

POWER TRAIN ASSEMBLY

CROSS-REFERENCE TO RELATED APPLICATIONS

The present this invention claims the benefit of U.S. provisional application Serial No. 60/315,118, filed Aug. 27, 2001, entitled "Power Train Assembly".

BACKGROUND

1. Field of the Invention

The present invention generally relates to motor vehicle power train assemblies. More specifically, the present invention relates to an all wheel drive power train assembly.

2. Description of the Prior Art

Historically, automobiles in the United States have primarily utilized rear wheel drive power delivery schemes. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Today, a significant portion of new automobiles in the United States, and perhaps the world, are front wheel drive based vehicles. In a typical front wheel drive vehicle, typically both the engine and the transmission assembly are transversely oriented relative to the vehicle. By positioning the engine and transmission assembly transversely in the vehicle, a more direct coupling of the transmission assembly to the vehicle's transaxle and front wheels is achieved. In doing so, the final drive unit (where the last torque multiplication takes place) and the front wheel differential are often incorporated directly into the transmission assembly itself.

With front wheel drive vehicles themselves becoming a mature market, a recent trend in the automobile industry has been to adapt front wheel drive schemes for all or four wheel drive applications. This is accomplished by providing a power transfer unit that diverts a portion of the power from the front wheels to a rear wheel drive shaft and, subsequently, the rear wheels.

Seen in FIGS. 1a and 1b is a typical prior art power transfer unit 10. The power transfer unit 10 includes a housing 12 within which is located a gear set 14 comprised of a parallel gear set 16 and a non-parallel gear set 18. The parallel gear set 16 includes a cylindrical extension 20 that operates as its input and this input 20 is coupled to the transversely oriented output 22 of the transmission assembly by way of a splined engagement 24. The cylindrical extension 20 is off of a gear wheel 26 or may be a sleeve to which the gear wheel 26 mounts. From the gear wheel 26, power is transferred through a second and third gear wheel, respectively 32 and 34. These gear wheels 32 and 34 are each supported on bearings 36 for rotation about axes 38 and 40 that are parallel to the rotational axis 28 of the first gear wheel 26.

The non-parallel gear set 18 includes a bevel ring gear 44 that is mounted to a shaft or sleeve 42 onto which the third wheel gear 34 is mounted or formed therewith. The bevel ring gear 44 engages a bevel pinion gear 46 mounted to another shaft 48 whose axis is generally perpendicular (and therefore non-parallel) to that of shaft 42. Mounted to an opposing end of the shaft 48 is an output member 50, illustrated as including a flange 52 and appropriately located bolt openings 54. The latter features enable the output member 50 to be bolted to a rear drive shaft (not shown).

As seen in FIG. 1a, the line 56 along which the gear wheels 26, 32 and 34 of the parallel gear set 16 engage with one another generally corresponds with the axis about which the output member 50 rotates. When locating of the power transfer unit 10 relative to the output of the transmission 22, this line 56 may be offset from the centerline of the vehicle. Additionally and as seen in FIG. 1b, the axis 28 of input into the power transfer unit 10, is offset, vertically or elevationally in the vehicle, relative to the output axis 58 about which the output member 50 rotates. This "drop" or height decrease from the transmission assembly output 22 to the output member 50 results from the relative positioning of the first, second and third helical gears 26, 32 and 34 of the parallel gear set 16, in conjunction with the non-parallel gear set 18. The non-parallel gear set 18 is a hypoid beveled gear set where the axis of rotation 40 of the bevel ring gear 44 does not intersect the axis 58 of rotation of the bevel gear 46.

Located within the transmission assembly, and before the output 22 thereof, is a final drive unit (illustrated schematically as box 57). The final drive unit 57 performs the last torque multiplication in the power train and is configured in any one of a number of conventional constructions well known in the art. One such construction is a planetary gear set with the input to the final drive unit 57 being through a sun gear while the output of the final drive assembly 57 is through a ring gear. The ring gear may be directly coupled to the transmission output 22 and therefore a large amount of torque is delivered to the power transfer unit 10.

Since the power transfer unit 10 receives power after the final drive assembly 57, the components of the power transfer unit 10 must be robust enough for high torque loads to pass therethrough. This adds size, weight and expense to the power transfer unit 10.

In view of the above and other limitations on the prior art, it is an object of the present invention to provide a drive train construction that permits a simpler design of various components, a decrease in the weight of the drive train, a compact construction and a limited amount of power transferred to the rear wheels.

SUMMARY OF THE INVENTION

In overcoming the above and other limitations on the prior art, a power train embodying the principles of the present invention is provided with intermediate output of a transmission that delivers power from the engine to a center differential (a planetary gear differential), which splits and transfers torque to the front wheels and the rear wheels of the vehicle. Through utilization of the power flow scheme of the present invention, it will readily be seen that the power transfer unit can be utilized on the transaxle before the final drive assembly. This allows the power transfer unit's components to be smaller, lighter and simpler in design.

In transferring torque to the front wheels, the sun gear of the center differential causes rotation of a sleeve, which in turn is the input into a planetary gear, final drive unit. The final drive unit multiplies the torque and transfers power to the front differential, which is illustrated as a bevel differential. Thereafter power is provided to the half shafts and subsequently to the front wheels.

In transferring torque to the rear wheels, another sleeve, coupled to the carrier of the center differential, operates as the input member for the power transfer unit and is splined to the input gear wheel of the parallel gear set. A gear wheel, chain, belt or other feature connects the input gear wheel to an output gear wheel of the parallel gear set which is integrally formed with a sleeve or splined to a shaft. The sleeve or shaft operates as the output of the parallel gear set and is connected to the input of a non-parallel gear set.

In the non-parallel gear set, power is generally transferred via the sleeve or shaft to a set of bevel gears and specifically from an input or first axis to a second axis that is non-parallel to the input axis. This transfer of power is effectuated by a first bevel gear mounted or integrally formed on an opposite end of the sleeve or shaft to which the output gear wheel is mounted. A second bevel gear (engaging the first bevel gear) is mounted to a shaft, or integrally formed with the shaft, and operates as the output of the non-parallel gear set. Finally, an output member coupled to the shaft transfers power to the rear wheel drive shaft from the non-parallel gear set.

Simultaneous with the transfer of power to the power transfer unit and the rear wheels, power from the center differential is transferred in parallel to a biasing or torque limiting device. This device is coupled to the input gear wheel of the power transfer unit and operates so as to limit the amount of torque transferred therethrough to the rear wheels.

Additional benefits and advantages of the present invention will become apparent to those skilled in the art, to which the present invention relates, from the subsequent description of the preferred embodiments and the appended claims, taken in conjunction with the accompanying drawings.

DETAILED DESCRIPTION OF THE PREFERRED EMBODIMENTS

Figure 1A:
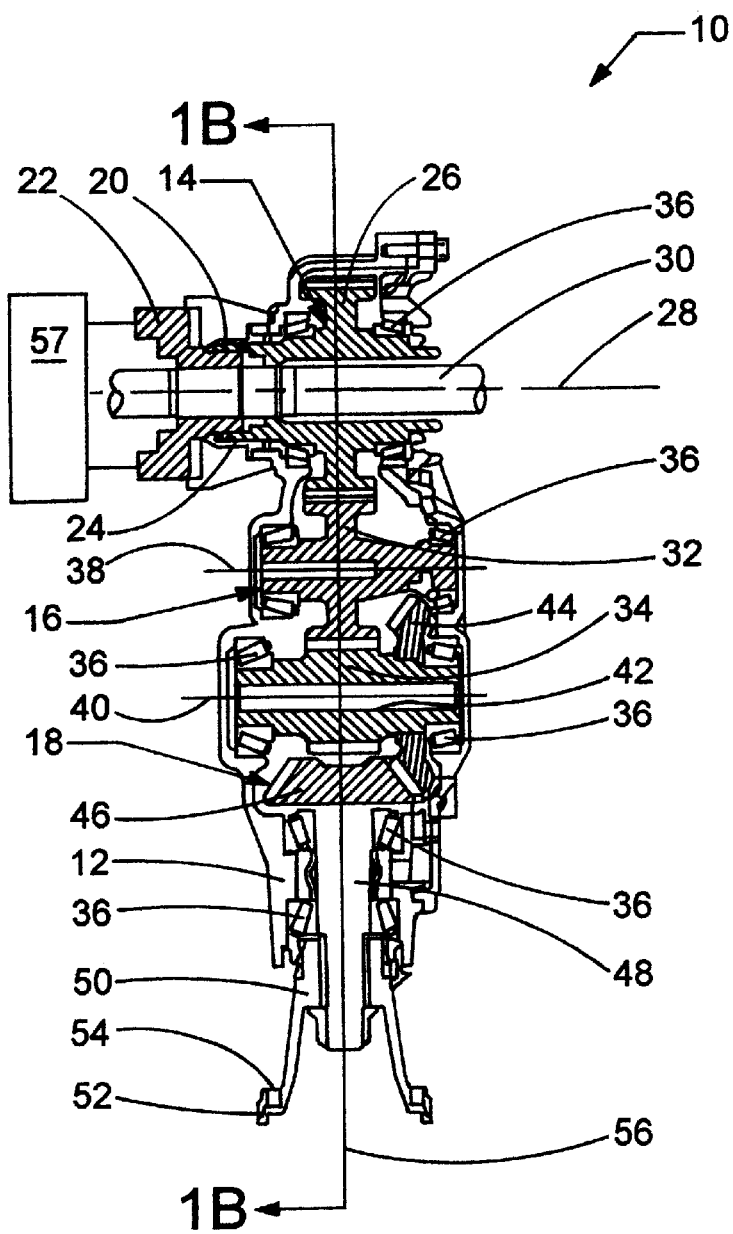
FIG. 1a is a cross-sectional view of a power train assembly according to the prior art and incorporating a power transfer unit.
Figure 1B:
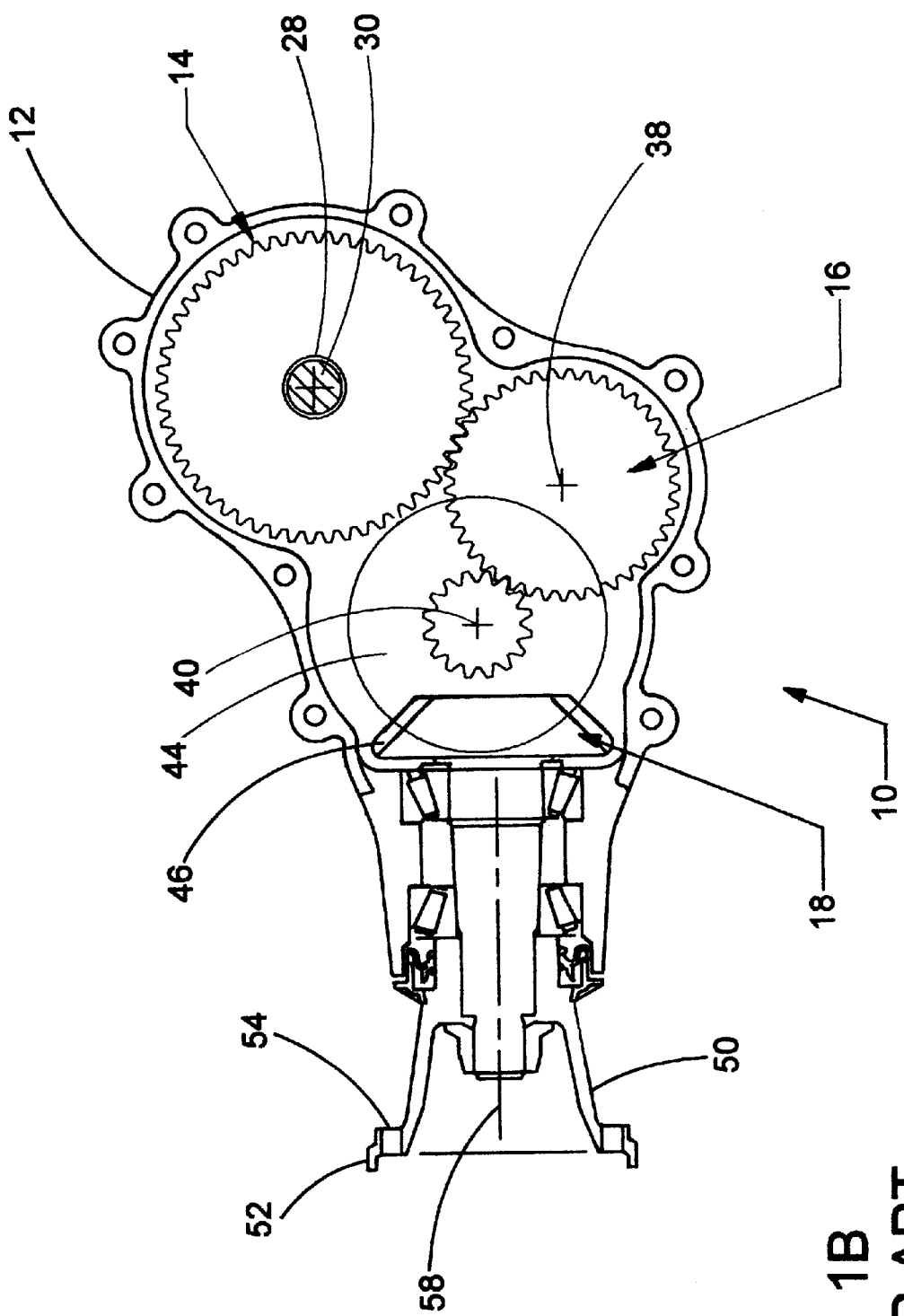
FIG. 1b is a cross-sectional view, taken generally along line 1b—1b in FIG. 1a, further illustrating a power train assembly according to the prior art.
Figure 2:
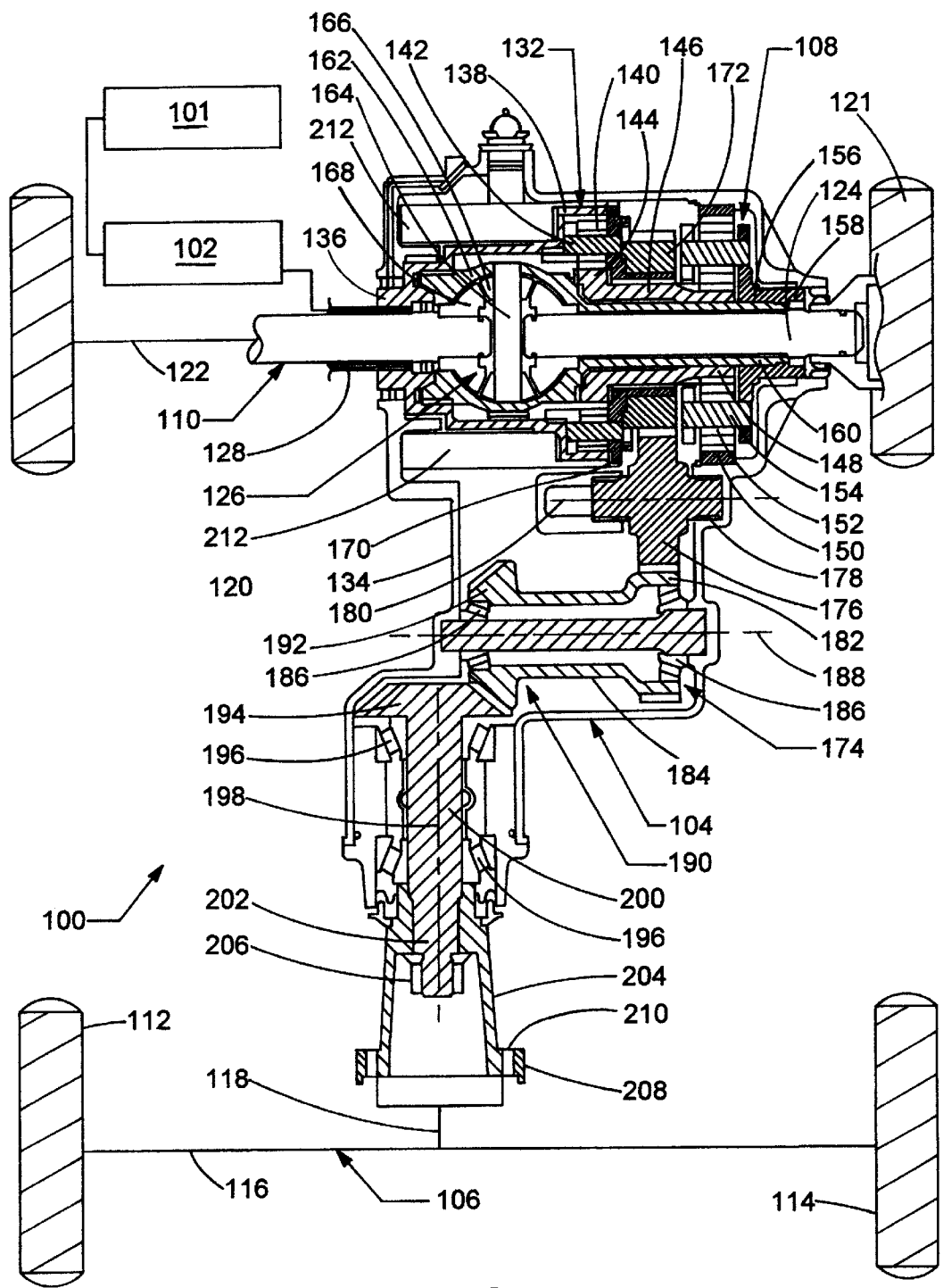
FIG. 2 is a combined schematic and cross-sectional view of a power train assembly according to the principles of the present invention.

Referring now to the drawings, a power train assembly according to the principles of the present invention is illustrated in FIG. 2 and generally designated at 100. The power train assembly 100 principally includes a power plant 101, a transmission assembly 102, a power transfer unit 104, a rear drive line 106, a final drive unit 108 and a front drive line 110. As will be readily noted, some of the components mentioned above are schematically illustrated in FIG. 2, and are therefore not to scale, while other components are illustrated cross-sectionally and in detail. Of those components illustrated schematically, it is submitted that the features thereof will be readily appreciated by persons skilled in the art to which the present invention relates. In the interest of clarity and conciseness, these components are therefore only briefly mentioned and discussed in context with other components described in greater detail.

Two primary components illustrated schematically include the rear drive line 106 and the front drive line 108. As seen in FIG. 2, the rear drive line 106 terminates in a left and right rear wheels 112, 114 that are coupled to the left and right rear half shafts, collectively referred to as the rear axle 116. A rear differential (not shown) splits torque or power between the rear wheels 112 and 114 and is coupled by a rear drive shaft 118 to the power transfer unit 104.

The front drive line 110 similarly includes left and right front wheels 120, 121 coupled to left and right half shafts 122, 124. The half shafts 122, 124 are in turn coupled to the left and right outputs of a front differential 126. The front differential 126 splits torque between the front wheels 120, 121 and receives torque from the final drive unit 108, where both the front differential 126 and the final drive unit 108 are more fully described below.

Also shown schematically in FIG. 2 are the power plant 101 and transmission assembly 102. In most instances, the power plant 101 will be an internal combustion engine. It could, however, be other types of engines or power plants including diesel, hybrid electric, fuel cell, etc. As will be readily appreciated, these and other types of power plants will similarly effect and alter various other components of the power train assembly 100 from that described herein. The power plant 101 is coupled to the transmission assembly 102, which may be of a manual or automatic variety. The transmission assembly 102 includes an output 128 that is coupled through a center differential 132 to the input of the power transfer unit 104 and to the input of the first drive unit 108.

The output of the transmission assembly 102 is seen as an externally splined sleeve 128. Onto this sleeve 128, an internally splined hub 136 is engaged. The opposing end of the hub 138 forms the input for the center differential 132 mentioned above.

The center differential 132 utilized in the present invention is a planetary gear differential with the end of the hub 136 forming an internally toothed ring gear 138 thereof. Planet gears 140 are mounted for rotation about pins 142 and provide an output from the center differential 132 to the rear wheels 112, 114 of the vehicle. A sun gear 144 provides the output to the front wheels 120, 121 of the vehicle. Preferably, torque is split in the center differential 132 with 60% of the power being transmitted to the front drive line 110 and 40% of the power being transmitted to the rear drive line 106. Obviously, the torque split ratio may be altered as required by other vehicle design criteria.

In transferring its output torque to the front drive line 110, the sun gear 144 causes rotation of a sleeve 146 that is integrally formed with the sun gear 144, as shown, or may be engaged with the sun gear 144 in a splined or other appropriate engagement. The opposing end of the sleeve 146 is provided with external teeth and forms the input and sun gear 148 of the final drive unit 108, which is accordingly a planetary gear set. The fixed gear of the final drive unit 108 is a ring gear 150, which is illustrated as being coupled to the housing 134 mentioned above. Planet gears 152 of the final drive unit 108 are supported on pins 154 that are in turn coupled to a carrier 156 that is the output of the final drive unit 108.

A central sleeve 158 extends from the carrier 156 and the sleeve 158 is internally splined so as to receive an extension 160 that operates as the input for the front differential 126. The final drive assembly 108 multiplies the torque transferred to it from the center differential 132. While illustrated as a planetary gear set, the final drive unit 108 may alternatively employ other types of torque multiplication mechanisms and schemes.

At the front differential 126, a bevel gear differential, the extension 160 is integrally formed with the differential housing 162 and a center pin 164 is supported by and extends diametrically through the differential housing 162. Pinion gears 166, rotatably mounted about the center pin 164, correspondingly engage with side gears 168 mounted to the inboard ends of the left and right half shafts 122, 124. In this manner, power from the final drive unit 108 is transmitted to the front wheels 120, 121 through and with the front differential 126 permitting relative rotation between the front wheels 120,121 as the vehicle undergoes cornering.

In transferring power to the rear wheels 112, 114, the planet gears 140 and pins 142 of the center differential are coupled to a carrier 170. The carrier 170 is coupled in parallel to the power transfer unit 104 and a biasing device 212. The biasing device 212 limits the amount of torque that can be transferred to the power transfer unit 104 through the center differential 132. This is achieved by incorporating into the biasing device 212 elements which inhibit movement rotation of the carrier 170 and therefore the rotational input speed to an input gear wheel 172 of the power transfer unit 104. By retarding the rotational speed of the carrier 170 and input gear wheel 172, an increased amount of torque is effectively transferred to the vehicle drive line. Biasing devices 212 of the general variety which may be employed with the present invention are well known and include, without limitation, friction clutch packs actuated through a variety of means including mechanical, hydraulic, viscous, electromechanical and other means.

As mentioned above, the carrier 170 is coupled in parallel to the input gear wheel 172 of the power transfer unit 104. In the illustrated construction, the carrier 170 supports the input gear wheel 172. The gear wheel 172 is provided with an internally splined passageway allowing it to be mounted to an externally splined cylindrical extension of the carrier 170. Alternative engagements could similarly be used.

The gear wheel 172 operates as the input for the power transfer unit 104 mentioned above and is part of a parallel gear set 174. As used herein, the term "parallel gear set" is intended to refer to any mechanism (including without limitation mechanisms having gear wheels, such as gear trains and chain gears, and mechanisms without gear wheels, such as belt systems) which transfers power from a first shaft or axis to a second shaft or axis, wherein the first and second axes are generally parallel. By way of illustration and not limitation, representative types of structures include straight, helical or spiral gear trains.

The first or input gear wheel 172 of the parallel gear set 174 is preferably a helical gear but may alternatively be a spur gear, and is positioned to rotate about an axis that is coaxial with the axis defined by the front half shafts 122, 124. The gear wheel 172 engages a second gear wheel 176 of the parallel gear set 174. The second gear wheel 176 is supported by bearings 178 within the housing 134 for rotation about an axis 180 which is substantially parallel to the axis defined by the front half shafts 122,124.

The output gear of the parallel gear set 174 is a driven gear 182 integrally formed on one end of a sleeve 184 that is supported by bearings 186 for rotation about a third axis 188. Alternatively, the driven gear 182 may be mounted to the sleeve 184. The opposing end of the sleeve 184 forms the input for a non-parallel gear set 190 of the power transfer unit 104.

As used herein, the term "non-parallel gear set" is intended to refer to any mechanism, including without limitation mechanisms with gear wheels, such as gear trains and chain gears, and mechanisms without gear wheels, such as belt systems, for transferring power from a first shaft or axis to a second shaft or axis, wherein the second axis is not generally parallel to the first axis. One illustrative structure is a beveled gear set. It is noted that the first and second axes need not intersect one another and, as such, another illustrative structure is a hypoid bevel gear set.

In the non-parallel gear set 190, power is transferred via the sleeve 184 to an input or first bevel gear 192 and then to a second bevel gear 194. The first bevel gear 192 is shown as being integrally formed with the sleeve 184 for rotation about axis 188. Alternatively, the first bevel gear 192 may be mounted to the sleeve 184.

The second bevel gear 194, while engaging the first bevel gear 192, is mounted for rotation about an axis 198 which is generally not parallel to axis 188. Instead, this axis 198 is generally perpendicular to axis 188.

Integrally formed with the second bevel gear 194 is a shaft 200, which is supported within the housing 134 by bearings 196. The distal end 202 of the shaft 200 is externally splined and engages an output member 204 retained on the shaft 200 by a retainer nut 206 or similar mechanism. The nut 206 is threadably engaged with the end 202 of the shaft. A flange 208 provided with a series of bolt holes 210 enables the output member 204 to readily be connected to rear drive line 106 and specifically the rear drive shaft While the above description constitutes the preferred embodiments of the present invention, it will be appreciated that the invention is susceptible to modification, variation and change without departing from the proper scope and fair meaning of the accompanying claims.

I claim:

1. An integral power train subassembly adapted for connecting to an output of the transmission assembly for an all wheel drive automotive vehicle, said subassembly comprising:

a center differntial, said center differential coupled to the transmission output and including a front driveline output and a rear driveline output, said center differential being a planetary gear set and said rear driveline output thereof being a carrier supporting planet gears in said planetary gear set;

a final drive unit coupled to the front driveline output, said final drive unit including a torque multiplier and a final drive output adapted to provide power to the front wheels of the vehicle;

a front differential coupled to said final drive output, said front differential including a left front wheel output and a right front wheel output;

a power transfer unit coupled to said rear driveline output independently of said final drive unit, said power transfer unit including a non-parallel gear set and a power transfer output adapted to provide power to the rear wheels of the vehicle; and a housing commonly enclosing said final drive unit, said front differential, and said power transfer unit.

2. The subassembly of claim 1 further comprising a biasing unit coupled to said power transfer unit, said biasing unit including interacting elements that limit rotational speed transferred through said power transfer unit thereby increasing torque provided to the wheels of the vehicle.

3. The subassembly of claim 2 wherein said biasing unit is coupled to the transmission output in parallel with said power transfer unit.

4. The subassembly of claim 2 wherein said biasing unit includes clutch plates.

5. The subassembly of claim 2 wherein said biasing unit is coupled to said rear driveline output of said center differential in parallel with said power transfer unit.

6. The subassembly of claim 2 wherein said biasing unit is coupled to one element of said center differential in parallel with said power transfer unit.

7. The subassembly of claim 1 wherein said center differential is located within said housing.

8. The subassembly of claim 1 wherein said power transfer unit includes a parallel gear set.

9. The subassembly of claim 8 wherein said parallel gear set includes an input gear wheel and an output gear wheel.

10. The subassembly of claim 8 wherein said parallel gear set forms a gear drop.

11. The subassembly of claim 8 wherein said parallel gear set is located intermediate said non-parallel gear set and an input of said power transfer unit.

12. The subassembly of claim 1 wherein said non-parallel gear set is a bevel gear set.

13. The subassembly of claim 1 wherein said non-parallel gear set is a hypoid bevel gear set.

14. The subassembly of claim 1 wherein said final drive unit is a planetary gear set.

15. The subassembly of claim 14 wherein planet gears of said final drive unit are an output therefor and a sun gear is an input therefor.

16. The subassembly of claim 1 wherein said front differential is a bevel gear differential.

17. A power train assembly of an all wheel drive automotive vehicle, said assembly comprising:
- a transmission assembly having a transmission output, said transmission assembly adapted to be transversely oriented with respect to a longitudinal axis of the vehicle;
- a center differential, said center differential coupled to said transmission output and including front driveline output and a rear driveline output, said center differential being a planetary gear set and said rear driveline output thereof is a carrier supporting planet gears in said planetary gear set;
- a final drive unit coupled to said front driveline output, said final drive unit including a torque multiplier and a final drive output adapted to provide power to the front wheels of the vehicle;
- a front differential coupled to said final drive output, said front differential including a left front wheel output and a right front wheel output;
- a power transfer unit coupled to said rear driveline output independently of said final drive unit, said power transfer unit including a non-parallel gear set and a power transfer output adapted to provide power to the rear wheels of the vehicle;
- a biasing unit coupled to said power transfer unit, said biasing unit including interacting elements that limit rotational speed transferred through said power transfer unit and increasing torque provided to the front wheels of the vehicle; and
- a housing commonly enclosing said center differential, said final drive unit, said front differential, said biasing unit and said power transfer unit.

18. An integral power train subassembly adapted for connecting to an output of the transmission assembly for an all wheel drive automotive vehicle, said subassembly comprising:
- a center differntial, said center differential coupled to the transmission output and including a front driveline output and a rear driveline output, said center differential being a planetary gear set and said rear driveline output thereof being a carrier supporting planet gears in said planetary gear set;
- a final drive unit coupled to the front driveline output, said final drive unit including a torque multiplier and a final drive output adapted to provide power to the front wheels of the vehicle;
- a front differential coupled to said final drive output, said front differential including a left front wheel output and a right front wheel output;
- a power transfer unit coupled to said rear driveline output independently of said final drive unit, said power transfer unit including a non-parallel gear set and a power transfer output adapted to provide power to the rear wheels of the vehicle;
- a biasing unit, said biasing unit coupled to said power transfer unit and including interacting elements that limit rotational speed transferred through said power transfer unit thereby increasing torque provided to the wheels of the vehicle, said biasing unit being coupled to said rear driveline output of said center differential in parallel with said power transfer unit; and
- a housing commonly enclosing said final drive unit, said front differential, and said power transfer unit.

* * * * *